United States Patent
Batra et al.

(10) Patent No.: US 11,037,367 B2
(45) Date of Patent: Jun. 15, 2021

(54) DIGITAL MEDIA ENVIRONMENT FOR INTUITIVE MODIFICATIONS OF DIGITAL GRAPHICS

(71) Applicant: Adobe Inc., San Jose, CA (US)

(72) Inventors: Vineet Batra, Pitam Pura (IN); Mridul Kavidayal, Noida (IN); Matthew David Fisher, Palo Alto, CA (US); Daniel M. Kaufman, Seattle, WA (US); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/674,931

(22) Filed: Nov. 5, 2019

(65) Prior Publication Data
US 2020/0066038 A1    Feb. 27, 2020

Related U.S. Application Data

(63) Continuation of application No. 15/852,924, filed on Dec. 22, 2017, now Pat. No. 10,510,186.

(51) Int. Cl.
*G06T 17/20* (2006.01)
*G06F 3/048* (2013.01)
(Continued)

(52) U.S. Cl.
CPC .............. *G06T 17/20* (2013.01); *G06F 3/048* (2013.01); *G06T 11/00* (2013.01); *G06T 19/20* (2013.01);
(Continued)

(58) Field of Classification Search
None
See application file for complete search history.

(56) References Cited

U.S. PATENT DOCUMENTS

| 5,611,036 A | 3/1997 | Berend et al. |
| 5,861,889 A | 1/1999 | Wallace et al. |

(Continued)

FOREIGN PATENT DOCUMENTS

EP    2530623    12/2012

OTHER PUBLICATIONS

"Adobe Illustrator CC Tutorials", Retrieved at: https://helpx.adobe.com/in/illustrator/how-to/dynamic-symbols.html—on Jan. 8, 2019, 8 pages.

(Continued)

*Primary Examiner* — Peter Hoang
(74) *Attorney, Agent, or Firm* — FIG. 1 Patents

(57) ABSTRACT

Techniques for intuitive modifications of digital graphics in a digital media environment are described. For example, a digital graphics creation system accesses vector artwork including a vector object, such as a Bezier curve. The digital graphics creation system receives user inputs, including a user input defining handles on the vector object and a user input interacting with the handles indicating a desired change to the vector object. The digital graphics creation system modifies the vector artwork, including the vector object, by accounting for topology of the vector object and maintaining connections between connected segments of the vector object. The digital graphics creation system outputs the modified vector artwork, including the vector object, such as in a user interface.

20 Claims, 11 Drawing Sheets

(51) Int. Cl.
  *G06T 19/20* (2011.01)
  *G06T 11/00* (2006.01)
(52) U.S. Cl.
  CPC ...... *G06T 2200/24* (2013.01); *G06T 2210/21* (2013.01)

(56) References Cited

U.S. PATENT DOCUMENTS

| | | | |
|---|---|---|---|
| 5,894,310 | A | 4/1999 | Arsenault et al. |
| 6,154,221 | A | 11/2000 | Gangnet |
| 6,268,871 | B1* | 7/2001 | Rice ...................... G06T 11/203 345/442 |
| 6,441,823 | B1 | 8/2002 | Ananya |
| 6,448,964 | B1 | 9/2002 | Isaacs et al. |
| 6,781,597 | B1 | 8/2004 | Vrobel et al. |
| 6,919,888 | B1 | 7/2005 | Perani et al. |
| 7,196,707 | B2 | 3/2007 | Davignon |
| 7,218,326 | B1 | 5/2007 | Bogues et al. |
| 7,302,650 | B1 | 11/2007 | Allyn et al. |
| 7,496,416 | B2 | 2/2009 | Ferguson et al. |
| 7,868,887 | B1 | 1/2011 | Yhann |
| 7,884,834 | B2 | 2/2011 | Mouilleseaux et al. |
| 8,004,539 | B2 | 8/2011 | McDaniel et al. |
| 8,373,704 | B1 | 2/2013 | Mueller |
| 8,629,871 | B2 | 1/2014 | O'Brien et al. |
| 8,830,226 | B2 | 9/2014 | Goossens |
| 8,994,736 | B2 | 3/2015 | Carr et al. |
| 9,024,938 | B2 | 5/2015 | Joshi |
| 9,454,797 | B2 | 9/2016 | Popovic et al. |
| 10,388,045 | B2 | 8/2019 | Batra et al. |
| 10,410,317 | B1 | 9/2019 | Phogat et al. |
| 10,510,186 | B2 | 12/2019 | Batra et al. |
| 10,832,446 | B2 | 11/2020 | Phogat et al. |
| 10,878,604 | B2 | 12/2020 | Batra et al. |
| 10,943,375 | B2 | 3/2021 | Phogat et al. |
| 2003/0033050 | A1 | 2/2003 | Yutkowitz |
| 2005/0237325 | A1 | 10/2005 | Motter et al. |
| 2007/0038421 | A1 | 2/2007 | Hu et al. |
| 2009/0213143 | A1 | 8/2009 | Igarashi |
| 2010/0189362 | A1 | 7/2010 | Jakubiak et al. |
| 2010/0214312 | A1 | 8/2010 | Weber et al. |
| 2012/0154397 | A1 | 6/2012 | Chernikov et al. |
| 2013/0120457 | A1 | 5/2013 | Popovic et al. |
| 2013/0300736 | A1 | 11/2013 | Schmidt |
| 2014/0104266 | A1 | 4/2014 | Stone et al. |
| 2014/0168270 | A1* | 6/2014 | Choy .................... G06T 3/0093 345/647 |
| 2015/0022517 | A1 | 1/2015 | Jutan et al. |
| 2015/0287210 | A1 | 10/2015 | Song et al. |
| 2018/0040169 | A1 | 2/2018 | Nakagawa |
| 2018/0061092 | A1* | 3/2018 | Sasikumar .......... G06F 3/04845 |
| 2018/0061093 | A1* | 3/2018 | Liu ....................... G06T 11/203 |
| 2019/0197771 | A1 | 6/2019 | Batra et al. |
| 2019/0206100 | A1 | 7/2019 | Batra et al. |
| 2019/0279406 | A1 | 9/2019 | Batra et al. |
| 2019/0295217 | A1 | 9/2019 | Phogat et al. |
| 2019/0318523 | A1 | 10/2019 | Higginbottom |
| 2020/0219287 | A1 | 7/2020 | Phogat et al. |
| 2020/0334874 | A1 | 10/2020 | Phogat et al. |

OTHER PUBLICATIONS

"Barycentric coordinate system—Wikipedia", https://en.wikipedia.org/wiki/Barycentric_coordinate_system—Retrieved on Oct. 11, 2017, 9 pages.
"Bounding volume hierarchy—Wikipedia", https://en.wikipedia.org/wiki/Bounding_volume_hierarchy—Retrieved on Oct. 11, 2017, 3 pages.
"Combined Search and Examination Report", GB Application No. 1816796.5, dated Apr. 17, 2019, 5 pages.
"Final Office Action", U.S. Appl. No. 15/852,924, dated Apr. 30, 2019, 17 pages.
"First Action Interview Office Action", U.S. Appl. No. 15/852,924, dated Oct. 11, 2018, 5 pages.
"First Action Interview Office Action", U.S. Appl. No. 15/936,299, dated Jan. 18, 2019, 4 pages.
"Kabsch algorithm—Wikipedia", Retrieved at: https://en.wikipedia.org/wiki/Kabsch_algorithm—Sep. 27, 2017, 4 pages.
"Notice of Allowance", U.S. Appl. No. 15/852,924, dated Aug. 2, 2019, 8 pages.
"Notice of Allowance", U.S. Appl. No. 15/861,908, dated Apr. 3, 2019, 14 pages.
"Notice of Allowance", U.S. Appl. No. 15/936,299, dated May 3, 2019, 9 pages.
"Pre-Interview First Office Action", U.S. Appl. No. 15/852,924, dated Jul. 27, 2018, 4 pages.
"Pre-Interview First Office Action", U.S. Appl. No. 15/861,908, dated Jan. 18, 2019, 22 pages.
"Pre-Interview First Office Action", U.S. Appl. No. 15/936,299, dated Sep. 21, 2018, 4 pages.
"Ramer—Douglas—Peucker algorithm—Wikipedia", https://en.wikipedia.org/wiki/Ramer%E2%80%93Douglas%E2%80%93Peucker_algorithm—Retrieved on Oct. 11, 2017, 4 pages.
Au,"Skeleton Extraction by Mesh Contraction", ACM Trans. Graph., 27(3):44:1{44:10,, Aug. 2008, 10 pages.
Batra,"Digital Media Environment for Intuitive Modifications of Digital Graphics", U.S. Appl. No. 15/852,924, filed Dec. 22, 2017, 60 pages.
Batra,"Generating a Triangle Mesh for an Image Represented by Curves", U.S. Appl. No. 15/861,908, filed Jan. 4, 2018, 80 pages.
Batra,"Generating a Triangle Mesh for an Image Represented by Curves", U.S. Appl. No. 15/861,908, filed Jan. 4, 2018, 93 pages.
Boye,"A Vectorial Solver for Free-form Vector Gradient", ACM Trans. Graph. 31, 6, Article 173, Sep. 17, 2012, 10 pages.
De"Vector Field Processing on Triangle Meshes", in SIGGRAPH Asia 2015 Courses (SA '15), Nov. 2, 2015, 49 pages.
Igarashi,"As-Rigid-As-Possible Shape Manipulation", ACM Transactions on Graphics 2005, Aug. 2005, 1134-1141.
Jacobson,"Bounded Biharmonic Weights for Real-Time Deformation", In ACM SIGGRAPH 2011 Papers, SIGGRAPH '11, Jul. 2011, 8 pages.
Jacobson,"Fast Automatic Skinning Transformations", ACM Trans. Graph. 31,, Jul. 2012, 10 pages.
Komerska,"Haptic Gdraw: A fun and Easy to Use 3D Haptically Enhanced Sculpting Program", EuroHaptics 2004, Jun. 2004, 6 pages.
Liu,"Skinning Cubic B'ezier Splines and Catmull-Clark Subdivision Surfaces", ACM Trans. Graph. 33, 6, Article 190, Nov. 19, 2014, 9 pages.
Liu,"Skinning Cubic B'ezier Splines and Catmull-Clark Subdivision Surfaces", ACM Trans. Graph., 33(6):190:1{190:9, Nov. 19, 2014, 9 pages.
Martins,"Bezier Curve Quick Tips: Two Methods for Smooth Curves", Posted Sep. 16, 2014; https://learn.scannerlicker.net/2014/09/16/bezier-curve-quick-tips-two-methods-for-smooth-curves/, Sep. 16, 2014, 11 pages.
Phogat,"Bone Handle Generation", U.S. Appl. No. 16/241,719, filed Jan. 7, 2018, 42 pages.
Phogat,"Digital Image Transformation Environment using Spline Handles", U.S. Appl. No. 15/936,299, filed Mar. 26, 2018, 42 pages.
Schaefer,"Image Deformation Using Moving Least Squares", SIGGRAPH, 25(3), Aug. 2006, 8 pages.
Schneider,"An Algorithm for Automatically Fitting Digitized Curves", Academic Press Professional, Inc., San Diego, CA, USA, 1990., Aug. 1, 1990, pp. 612-626.
Shewchuk,"Triangle: Engineering a 2D Quality Mesh Generator and Delaunay Triangulator", Applied Computational Geometry: Towards Geometric Engineering, Lin M. C., Manocha D., (Eds.), val. 1148 of Lecture Notes in Computer Science. Springer-Verlag, May 1996, pp. 203-222. From the First ACM Workshop on Applied Computational Geometry., May 1996, 10 pages.
Visvalingam,"The Douglas-Peuker Algorithm for Line Simplification: Re-evaluation through Visualization", Sep. 1990, pp. 213-228.
Weng,"Sketching MLS Image Deformations on the GPU", Pacific Graphics 2008, vol. 27, Oct. 2008, 1789-1796.

(56) References Cited

OTHER PUBLICATIONS

"Pre-Interview First Office Action", U.S. Appl. No. 16/241,719, dated Feb. 5, 2020, 39 pages.
Cohen-Steiner,"Conforming Delaunay Triangulation in 3D", Jun. 2004, pp. 217-233.
"Pre-Interview First Office Action", U.S. Appl. No. 16/427,005, dated May 20, 2020, 23 pages.
"First Action Interview Office Action", U.S. Appl. No. 16/241,719, dated Mar. 17, 2020, 4 pages.
Huynh,"Bijective Deformations in Rn via Integral Curve Coordinates", May 1, 2015, 11 pages.
Karni,"Spectral Compression of Mesh Geometry", Jul. 2000, 8 pages.
Meng,"Interactive Image Deformation Using Cage Coordinates on GPU", Jan. 2009, pp. 119-126.
Sorkine,"Laplacian Surface Editing", Jul. 2004, 10 pages.
"Corrected Notice of Allowability", U.S. Appl. No. 16/387,186, dated Oct. 30, 2020, 12 pages.
"Corrected Notice of Allowability", U.S. Appl. No. 16/241,719, dated Sep. 29, 2020, 2 pages.
"Notice of Allowance", U.S. Appl. No. 16/387,186, dated Oct. 20, 2020, 13 pages.
"First Action Interview Office Action", U.S. Appl. No. 16/427,005, dated Jul. 13, 2020, 3 pages.
"First Action Interview Office Action", U.S. Appl. No. 16/387,186, dated Sep. 11, 2020, 3 pages.
"Notice of Allowance", U.S. Appl. No. 16/241,719, dated Jun. 22, 2020, 11 pages.
"Notice of Allowance", U.S. Appl. No. 16/427,005, dated Jul. 31, 2020, 12 pages.
"Pre-Interview First Office Action", U.S. Appl. No. 16/387,186, dated Jul. 13, 2020, 8 pages.
"Supplemental Notice of Allowability", U.S. Appl. No. 16/241,719, dated Jun. 26, 2020, 2 pages.
"Corrected Notice of Allowability", U.S. Appl. No. 16/387,186, dated Dec. 28, 2020, 2 pages.

* cited by examiner

DIGITAL MEDIA ENVIRONMENT FOR INTUITIVE MODIFICATIONS OF DIGITAL GRAPHICS

BACKGROUND

This application is a continuation of and claims priority to U.S. patent application Ser. No. 15/852,924, filed Dec. 22, 2017, which is incorporated by reference herein in its entirety.

BACKGROUND

Vector artwork is becoming increasingly more common to create digital graphics that are smooth and can be scaled indefinitely without loss of quality. Digital graphics can be difficult to manipulate once created, however, even when the digital graphics are created using vector artwork. For instance, conventional digital graphics editing systems do not provide a way to accurately or intuitively manipulate a vector artwork when a user wants to move only a portion of the vector artwork without moving other parts of the vector artwork. On the other hand, conventional digital graphics editing systems often require users to manually change individual components of the vector artwork, such as Bezier curves that make up the vector artwork. More specifically, changes to digital graphics in many conventional digital graphics editing systems rely on user-specified modification of individual control points of the digital graphics, which requires precise interaction that is time consuming, tedious, and undesirable for users.

SUMMARY

Techniques for intuitive modifications of digital graphics in a digital media environment are described. For instance, a digital graphic includes a set of Bezier curves, which are used in conjunction with user-defined handles to edit a shape of the digital graphic. The user-defined handles can be used to control a direction of a Bezier curve or other components of the digital graphic without restricting the user to pre-defined handles. User interaction with the handles results in intuitive modifications to underlying Bezier curves in the shape, without explicit selection of specific points and/or curves as required by conventional digital graphics editing systems.

In one example, a digital graphics creation system accesses a vector artwork having at least one vector object, such as a Bezier curve. The digital graphics creation system receives user inputs, including a user input defining handles on the vector object and a user input interacting with the handles indicating a desired change to the vector object. The user input interacting with the handles causes a change in a location of at least one of the handles in a user interface. The digital graphics creation system then modifies the vector artwork, including the vector object, based on the interaction. To do so, the digital graphics creation system accounts for topology of the vector object and maintains connections between connected segments of the vector object. By accounting for topology and maintaining connections between connected segments, the digital graphics creation system preserves features of digital graphics such as the vector artwork across deformations, including preserving smoothness of curves in input geometry of digital graphics after deformations. The digital graphics creation system outputs the modified vector artwork, including the vector object, such as in the user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
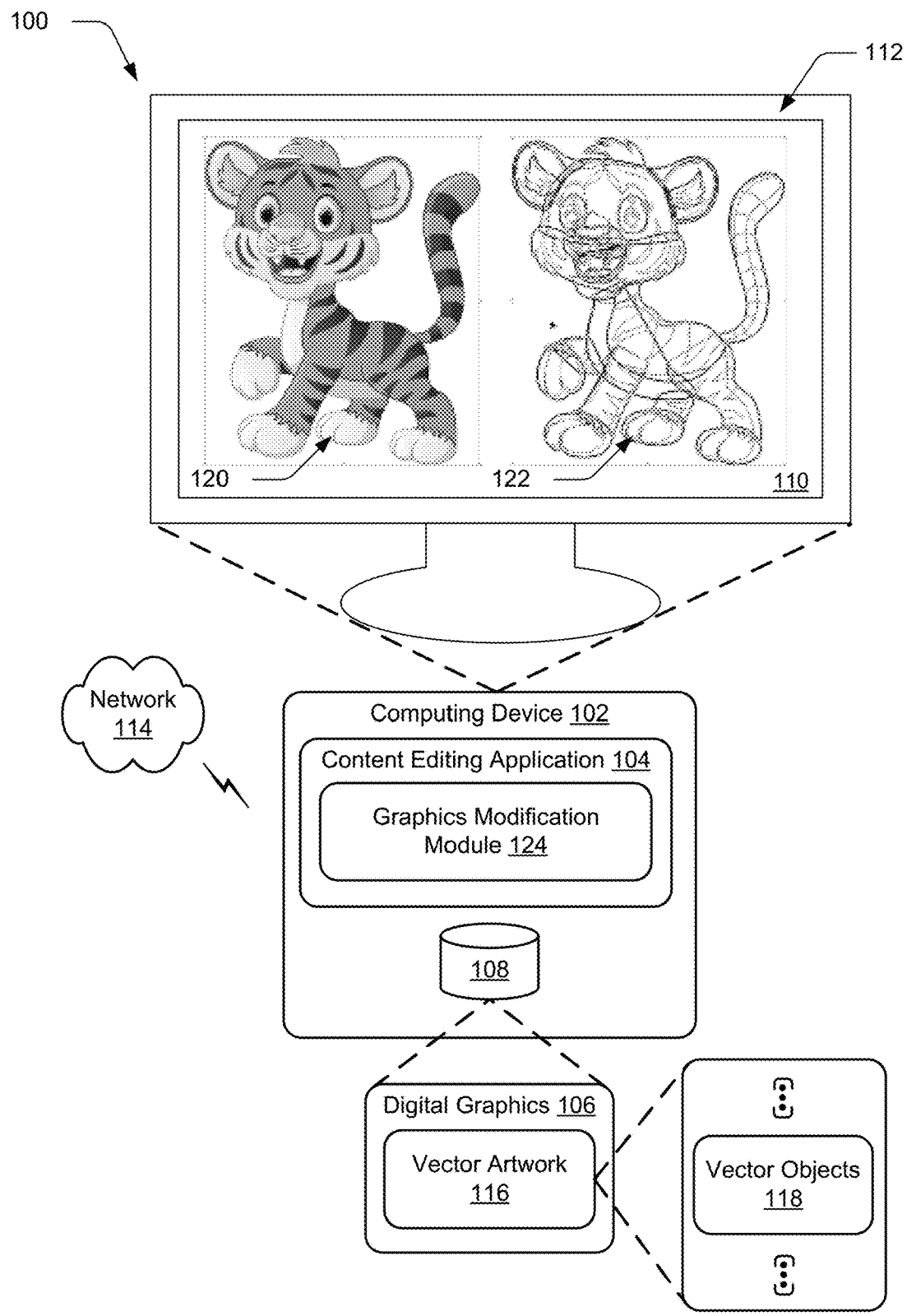
FIG. 1 is an illustration of an environment in an example implementation that is operable to employ techniques for intuitive modifications of digital graphics as described herein.

Digital graphics are becoming increasingly common, providing users with new and innovative ways to generate and manipulate digital graphics. Many forms of digital graphics, such as vector artwork, utilize paths, which are the underlying lines of an object, to create the object. For instance, a path may be a black line that appears when a line is drawn in a content editing application, such as Adobe Illustrator™. A path is made up of a series of points, referred to herein as "control points," connected by line segments between the control points. Control points may have control handles which can be used to control a direction of a curved path. Control points allow control of how tightly or loosely the curve of the path can be bent at each control point, and may be represented by small squares on the path. Control handles are tangent lines that allow a direction of the path to bend.

Paths give content creators immense freedom to generate innovative digital graphics. However, as a vector artwork increases in detail, so too do the number and complexity of control points of the vector artwork. This can make editing digital graphics in later stages of workflow, or after a digital graphic has been completed, incredibly time consuming and tedious, as numerous control points of multiple paths typically must be taken into consideration with each edit made to a digital graphic.

Conventional techniques to alleviate the tedious nature of digital graphics editing include Linear Blend skinning, which is used for deforming geometry of digital graphics represented by triangle meshes, or bounding resulting geometry by a set of cubic Bezier curves formulated as a quadratic energy minimization problem instead of a triangle mesh or raster. These conventional techniques, however, do not generate aesthetically pleasing results, are not fast enough to give real-time feedback when an edit is made to a digital graphic, can fail to converge in practical use cases, and are often slow in real-world scenarios and applications.

Accordingly, techniques and systems are described in which a digital graphics creation system provides intuitive modifications to digital graphics by refitting Bezier segments to transformed points subject to constraints derived from input curves of the digital graphics. The digital graphics creation system, for instance, may be configured to allow creation and editing of digital graphics and vector artwork as part of an application of a computing device in a variety of different ways. Examples of digital graphics creation and editing include use as part of an online application (via a subscription-based service system), provide opportunities to purchase a good or service, online storage, or other web service that is accessible via a network. Digital graphics and vector artwork may include a variety of different content that may be stored digitally or electronically, e.g., movies, books, documents, games, applications, images, audio files, and so on.

To begin, a digital graphics creation system accesses a vector artwork having at least one vector object. Vector objects are structures used to construct complex digital graphics for display on a display device. Vector objects may include, by way of example and not limitation, simple shapes such as points, lines, triangles, and polygons used to construct complex structures in digital graphics such as vector artwork or digital images. Vector objects also include intermediately complex structures such as Bezier curves, Bezier surfaces, Bezier objects, and groups of geometric primitives and/or Bezier shapes used to create complex geometry in digital graphics. Vector artwork uses the vector objects to represent images in digital graphics. Digital graphics may also include digital images, video, 3D modeling, animation, video games, implicit surface visualization, and so forth.

The digital graphics creation system receives user inputs, including a user input defining control handles (also referred to herein simply as "handles") on the vector object and a user input interacting with the handles indicating a desired change to the vector object. As discussed above, a control handle can be used to control a direction of a curved path, such as a Bezier curve of the vector artwork. For example, a smooth control point of a path can be made up of two linked handles that prevent the path from changing direction abruptly, while a corner point where two straight lines meet does not have any handles. By allowing a user to indicate the location of the handles, the user has freedom to indicate how and where the vector object will be modified, without restricting the user to predefined handles. The user input interacting with the handles causes a change in a location of at least one of the handles in a user interface. The user input may indicate the change in location with a mouse input, keyboard input, touch input, voice input, and so forth.

The digital graphics creation system then modifies the vector artwork, including the vector object, based on the interacting. To do so, the digital graphics creation system accounts for topology of the vector object and maintains connections between connected segments of the vector object. In an example, the digital graphics creation system first determines continuity between segments of a Bezier curve using geometry of the segments of the Bezier curve. In some cases, either an input or output tangent of a control handle line may be retracted, which causes continuity constraints between segments of a Bezier curve to not be applied, despite smoothness of the geometry of the Bezier curve. When control handle lines are retracted, deformations to the curve (e.g., when a user input modifies the vector artwork) sharp edges occur in regions that were previously smooth. In this example, the digital image creation system determines, or infers, the correct continuity in the case of a retracted control handle line using geometry of segments of the curve.

Continuing with the above example, the digital graphics creation system may receive the user input defining handles on the Bezier curve and a user input to deform the Bezier curve by interacting with the handles as the user inputs described above. The digital graphics creation system then generates a mesh based on the deformed Bezier curve which represents visual changes to the vector artwork as a result of the user input to deform the Bezier curve. Using the mesh, the digital graphics creation system locates control points that represent the deformations. The control points can be located by modeling the inferred continuity constraints as a Least Squares Problem (LSQ), which maintains the inferred continuity constraints. A LSQ is an approach in regression analysis to an approximate solution of sets of equations in which there are more equations than unknowns, where the overall solution minimizes the sum of the squares of residuals made in results of the included equations. The digital graphics creation system refits the segments of the original Bezier curve to the deformed Bezier curve using the control points while maintaining continuity between the segments of the original Bezier curve. In other words, the described techniques maintain the topology of the original digital graphic such that even where handles are retracted (or there are no handles to begin with), desired characteristics of the digital graphic are maintained such as smoothness and sharpness at different locations.

The digital graphics creation system outputs the modified digital graphic, such as in a user interface. In some cases, digital graphics other than a vector artwork may be used as an input for modification, such as a raster file or other type of digital image. When other inputs are used, the techniques described herein may be used to generate a vector artwork based on the deformed Bezier curve having refitted segments as described above, and output the vector artwork. By accounting for topology and maintaining connections between connected segments, the digital graphics creation system preserves features of digital graphics across deformations, including preserving smoothness of curves in input geometry after deformations.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for intuitive modifications of digital graphics as described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including a content editing application 104. The content editing application 104 is implemented at least partially in hardware of the computing device 102 to process and transform digital graphics 106, which are illustrated as maintained in a storage device 108 of the computing device 102. Such processing includes creation of the digital graphics 106, modification of the digital graphics 106, and rendering of the digital graphics 106 in a user interface 110 for output, e.g., by a display device 112 and/or stored in the storage device 108. Although illustrated as implemented locally at the computing device 102, functionality of the content editing application 104 may also be implemented in whole or in part via functionality available via the network 114, such as part of a web service or "in the cloud."

The digital graphics 106 may take a variety of forms, such as any content that may be stored digitally or electronically, including digital images that are rendered for output by the display device 112, vector artwork, movies, books, documents, games, applications, images, audio files, and so on. In one example, the content editing application 104 is a vector graphics editor that is configured to generate the digital graphics 106 as vector artwork 116. Vector artwork is defined through the use of polygons to represent images in computer graphics. Vector artwork is based on vector objects 118, which lead through vertices, also referred to as control points or nodes, that are defined using coordinates in two dimensions, e.g., X and Y axes, to define a direction of a path. Vector artwork may be defined using a variety of standards, examples of which include Scalable Vector Graphics (SVG), Portable Document Format (PDF), Encapsulated PostScript (EPS), Windows Metafile (WMF), Vector Markup Language (VML), and so forth.

As discussed above, a path of the vector objects 118 is made up of a series of control points connected by line segments between the control points. Control points of the vector objects 118 may have control handles which can be used to control a direction of a curved path. Control points allow control of how tightly or loosely the curve of the path can be bent at each control point. Control handles are tangent lines that allow a direction of the path to bend. One example of a vector object 118 is a Bezier curve, which are parametric curves used to model smooth curves in computer graphics, and can be combined to form paths.

The content editing application 104, for instance, may include a vector tool that is user-selectable via the user interface 110 to create vector artwork 116 using the vector objects 118. To do so, a user input may be received to define a location of a vector object 118 in the user interface 110 as X and Y coordinates, e.g., by "clicking" on a location in the user interface using a cursor control device or gesture. To delete the vector object 118, a user input may also be received to select and then delete the vertex, e.g., through use of an "Alt-click" in Windows® or "Option-click" in a MacOS® also using a cursor control device and key combination. Locations and properties of the vector objects 118 may be changed through a click-and-drag operation through use of a cursor control device or gesture to interact with the user interface 110, e.g., via touchscreen functionality. Vector artwork 116 may also be created by the content editing application 104 by converting other types of art, e.g., from bitmap art using a vector graphics conversion tool.

The illustrated user interface 110 includes examples of rendered first and second items of vector artwork 120, 122. The vector artwork 120 depicts the vector artwork with fill and/or stroke attributes applied to the vector objects that make up the artwork, thus presenting a "finalized" output of the vector artwork. The vector artwork 122, on the other hand, depicts the same vector artwork without the fill and/or stroke attributes applied to the vector objects that make up the vector artwork. Without the fill and/or stroke attributes applied, the vector artwork 122 provides a user with additional options in the user interface 110 to access individual vector objects for editing of the vector artwork. However, as discussed above, conventional systems for editing digital graphics and vector artwork require numerous control points of multiple paths to be taken into consideration with each edit made to the vector artwork. As shown in the vector artwork 122, a single item of vector artwork can be made up of dozens, or even hundreds, of vector objects. Therefore, conventional techniques for editing vector artwork can be extremely tedious and time consuming for users.

Accordingly, the content editing application 104 includes a graphics modification module 124 that is configured to process user inputs and provide intuitive modifications and deformations of digital graphics as described above and below. In implementations, the graphics modification module 124 obtains a digital graphic, such as from the digital graphics 106 located in the storage 108 of the computing device 102. Based on user inputs indicating a desired change to the digital graphic, the graphics modification module 124 modifies the digital graphic intuitively by maintaining connections between connected segments of the digital graphic and accounting for topology of the digital graphic.

By maintaining connections between connected segments of the digital graphic and accounting for topology of the digital graphic, the graphics modification module 124 preserves regular features of shapes present in the digital graphic across deformations while sustaining smoothness of curves of the input geometry and without adding additional degrees of freedom to components of the digital graphic. The digital graphic including the modifications can be output to a user interface of the computing device 102, such as in real time. For instance, the graphics modification module 124 solves a set of linear constraints associated with the modifications to the digital graphic, making performance of the modifications faster than conventional systems and ensuring real time feedback during interactive sessions.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
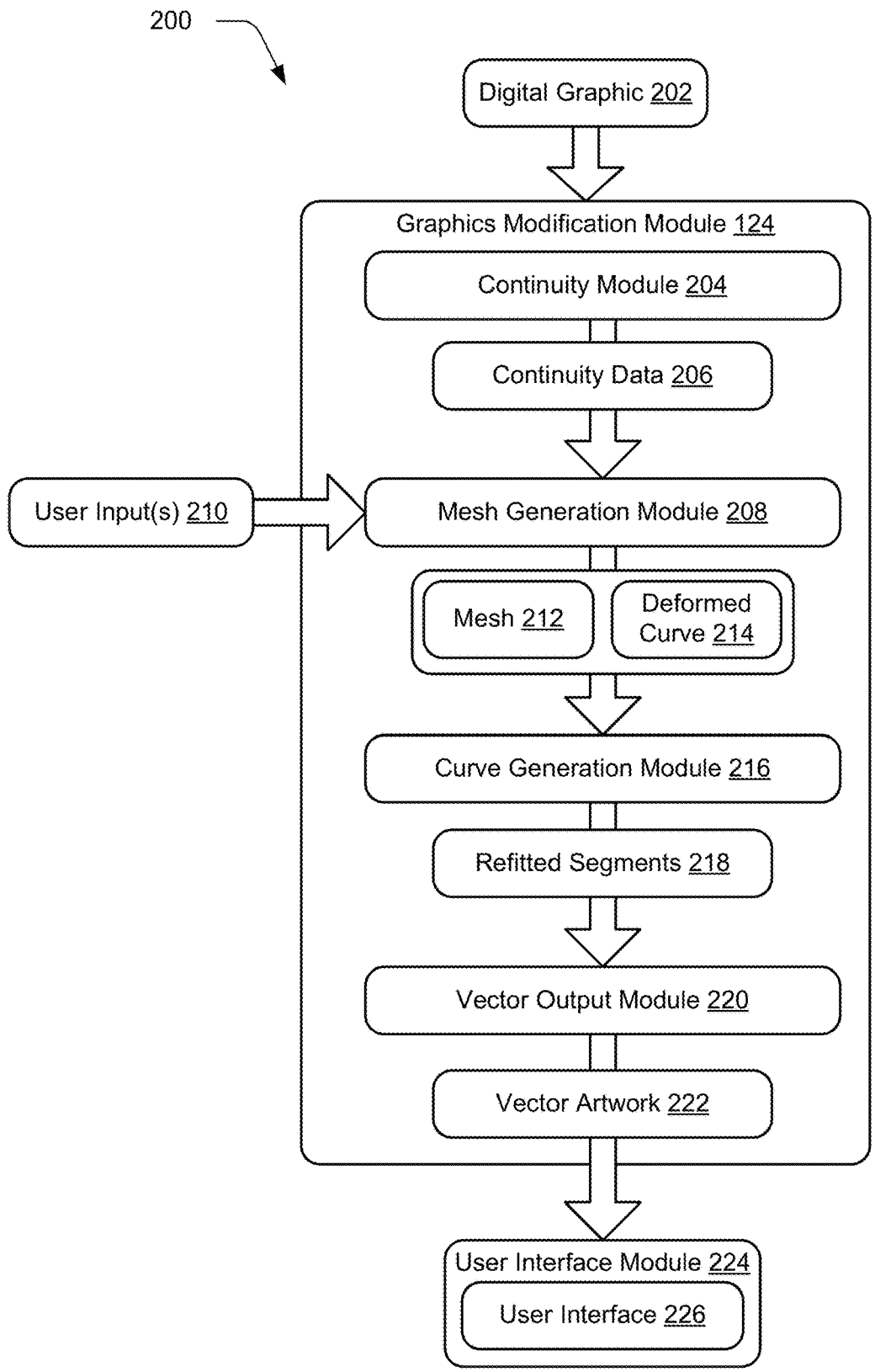
FIG. 2 depicts an example implementation showing operation of a graphic modification module of FIG. 1 in greater detail.

FIG. 2 depicts a system 200 in an example implementation showing operation of the graphics modification module 124 of FIG. 1 in greater detail. As discussed in more detail below, the graphics modification module 124 may solve the following equations to provide intuitive modifications of digital graphics:

$$t_{ij}^3 C_{0j} + t_{ij}^2(1-t_{ij})C_{1j} + t_{ij}(1-t_{ij})^2 C_{2j} + (1-t_{ij})^3 C_{3j} = d_{ij} \quad (1)$$

$$C_{3j} = C_{0j+1} \quad (2)$$

$$C_{3j} - C_{2j} = C_{1j+1} - C_{0j+1} \quad (3)$$

$$C_{3j} - C_{2j} = C_{1j+1} - C_{0j+1} \quad (4)$$

$$\frac{C_{31} - C_{21}}{\|C_{31} - C_{21}\|} = \frac{C_{12} - C_{02}}{\|C_{12} - C_{02}\|} \quad (5)$$

Where $C_j$ are control points of the $j^{th}$ Bezier segment, $t_{ij}$ is the $i^{th}$ parametric point of the $j^{th}$ Bezier segment, and $d_{ij}$ is the $i^{th}$ sample point of the $j^{th}$ Bezier segment. The second equation imposes $C^0$ continuity, the third equation imposes $C^1$ continuity, and the fourth equation imposes $G^1$ continuity, which are described below.

To begin this example, a continuity module 204 of the graphics modification module 124 receives a digital graphic 202, such as from the storage 108 of the computing device 102. The digital graphic 202 may be a vector artwork that includes one or multiple vector objects, such as Bezier curves, as described above. In some cases, the digital graphic 202 may not contain Bezier curves, but instead includes other shapes such as those used for user interface icons or shapes found in digital images, for instance.

In cases where the digital graphic 202 contains one or multiple Bezier curves, the continuity module 204 determines continuity between segments of a Bezier curve using geometry of the segments of the Bezier curve. To do so, the continuity module 204 may sample and triangulate Bezier segments, such as cubic Bezier segments, of the input Bezier curves using conforming Delaunay triangulation. Delaunay triangulation is a triangulation such that no point in a given set of discrete points in a plane is inside a circumcircle of any triangle in the plane, while maximizing the minimum angle of all angles of the tringles in the triangulation.

Continuity constraints of control points of the Bezier curves describe how the curves fit together, such as smooth points, straight corner points (e.g., the corners of a rectangle), curved corner points (e.g., the top dip of a heart shape), combination corner points (e.g., a straight corner point and a curved corner point meet), and so forth. Conventional vector graphics applications use first order continuity to ensure the smoothness of Bezier curves at joints. These effectively mean $C^1$ and $G^1$ continuity, where $C^1$ continuity implies that the derivative is continuous, (e.g., the left and right tangent at the point are same), and $G^1$ continuity implies unit tangent vector continuity (e.g., the left and right unit tangents at the point are same). $C^1$ continuity at a point inherently implies $G^1$ continuity.

Figure 3A:
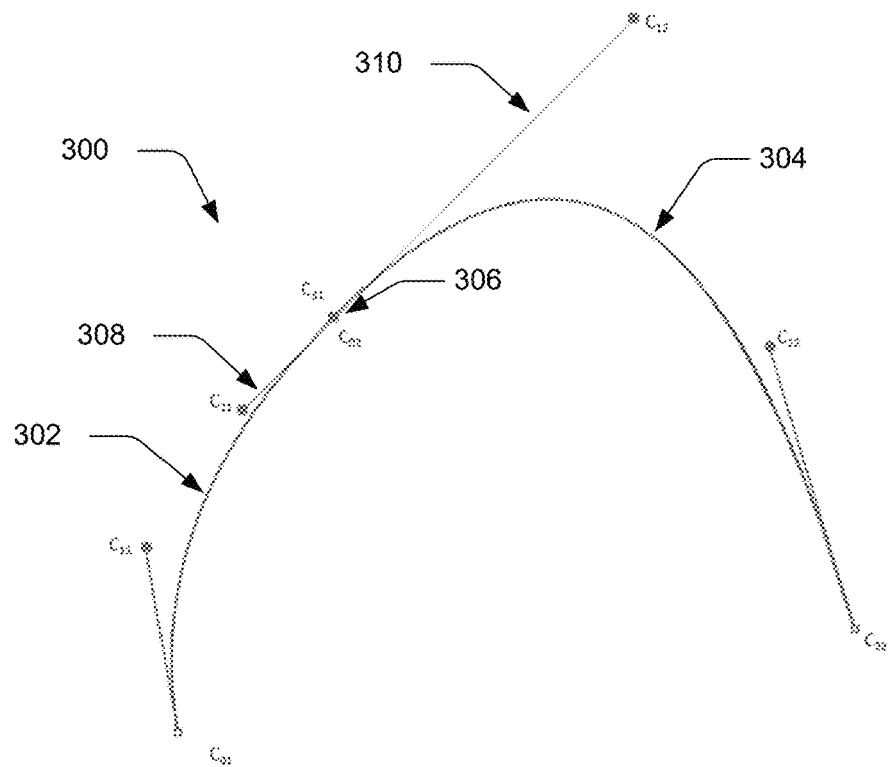
FIG. 3A depicts an example of control points of a cubic Bezier curve.

For example, consider FIG. 3A, which depicts an example of control points of a cubic Bezier curve 300. The Bezier curve 300 includes a first segment 302 and a second segment 304, which are connected at a control point 306. The control point 306 in this example includes two control handles 308 and 310, which are tangent lines to the control point and allow the direction of the path from the first segment 302 and the second segment 304 to bend. The control handle 308 represents the in-tangent, and the control handle 310 represents the out-tangent. $C^1$ continuity at the control point 306 would imply:

$$C_{31} - C_{21} = C_{12} - C_{02} \quad (6)$$

Whereas $G^1$ continuity at the control point 306 would imply:

$$\frac{C_{31} - C_{21}}{\|C_{31} - C_{21}\|} = \frac{C_{12} - C_{02}}{\|C_{12} - C_{02}\|} \quad (7)$$

Therefore, $G^1$ is independent of the length of the tangents of the control handles 308 and 310, therefore satisfying the $G^1$ continuity constraint.

Figure 3B:
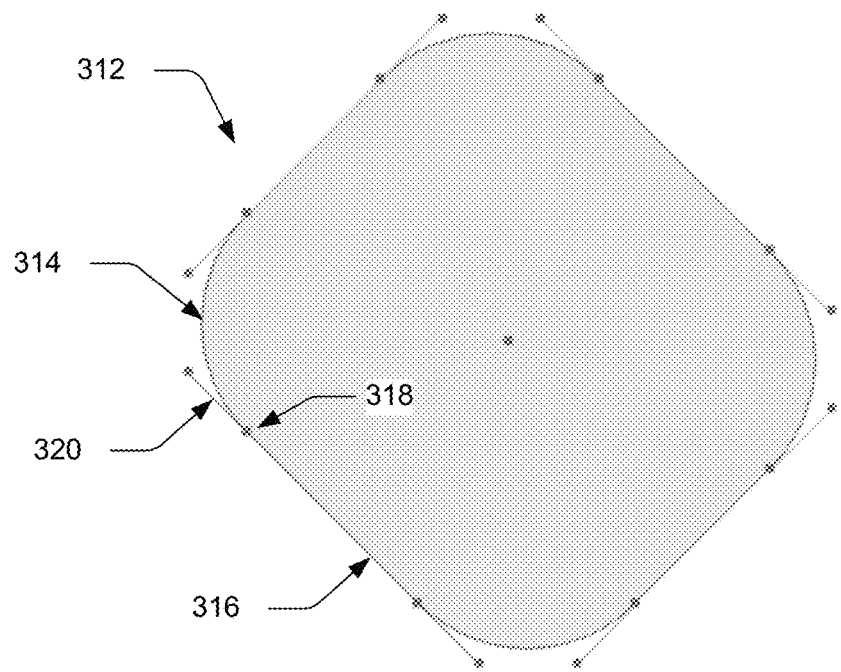
FIG. 3B depicts an example of retracted control points of a cubic Bezier curve.

In many user-created files, however, either the in-tangent (e.g., the control handle 308) or the out-tangent (e.g., the control handle 310) is retracted having a length of zero, even though the curve may still appear smooth. For example, consider FIG. 3B, which depicts an example of retracted control points of a cubic Bezier curve 312. Like the Bezier curve 300, the Bezier curve 312 includes a first segment 314 and a second segment 316 connected at a control point 318. The control point 318 includes only one control handle 320 in this example, however. In this case, either the in-tangent or the out-tangent of the control point 318 is retracted, having a length of zero, despite the appearance of the Bezier curve 312 remaining smooth.

When a control handle of a control point is retracted, the first order continuity constraints $C^1$ and $G^1$ are inadequate and many times, despite the inherent smoothness of the geometry, the continuity constraints are not applied. When either the in-tangent or the out-tangent is retracted, conventional techniques that apply deformation to a curve obtain sharp edges in regions of the curve that were originally smooth. Consequently, neither $C^1$ or $G^1$ are applicable, and the deformed curve loses its inherent smoothness.

Returning to a discussion of FIG. 2, the continuity module 204 resolves problems caused by retracted handles by determining, or inferring, correct continuity between segments of a Bezier curve using geometry of the segments of the curve. For instance, suppose $C_{01}$, $C_{11}$, $C_{21}$, and $C_{31}$ are the control points of one curve and $C_{02}$, $C_{12}$, $C_{22}$, and $C_{32}$ are the control points of an adjacent curve, where the two curves are $C^0$ continuous (e.g., $C_{31}=C_{02}$). Even in cases where one of the tangents is retracted (e.g., length is zero) the continuity module 204 infers continuity where the curves meet. If the in-tangent is retracted, this implies that $C_{21}=C_{31}$. In such a scenario, the continuity module 204 checks for $C^1$ continuity using the following:

$$C_{31}-C_{11}=C_{12}-C_{02} \qquad (8)$$

In other words, the continuity module 204 considers the out-tangent at the previous point ($C_{11}$) when determining continuity. Similarly, if the out-tangent is retracted, the continuity module 204 takes the in-tangent of the next point ($C_{22}$) into consideration, and $C^1$ continuity is checked using the following:

$$C_{31}-C_{21}=C_{22}-C_{02} \qquad (9)$$

If this continuity check passes, the continuity module 204 extends the retracted handle, such as to quarter-length of the corresponding segment. For example, if in-tangent is zero, $C_{21}$ is set to one-quarter of the length of the first segment, and if out-tangent is zero, $C_{12}$ is set to one-quarter of the length of the first segment, as follows:

$$\begin{cases} C_{21} = 0.25(C_{11} - C_{31}) & \text{if } C_{21} = C_{31} \\ C_{12} = 0.25(C_{22} - C_{02}) & \text{if } C_{12} = C_{02} \end{cases} \qquad (10)$$

Other lengths of extensions of the retracted handle are also considered, such as a set length, a length based on the non-retracted handle, different proportions of the corresponding segment, and so forth.

Figure 4:
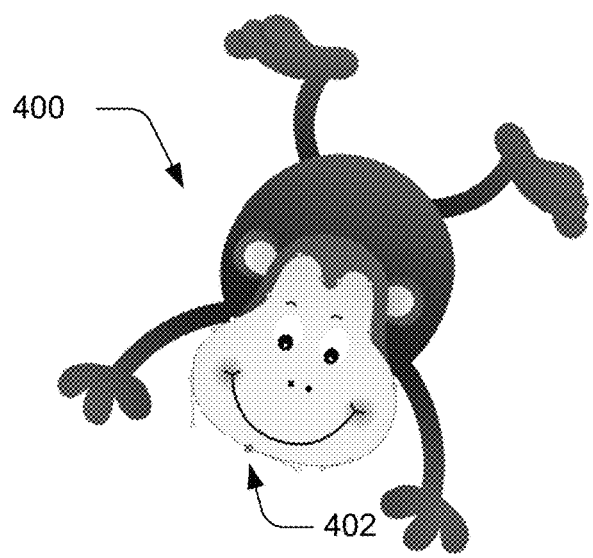
FIG. 4 depicts an example of a digital graphic as transformed using a process without applied continuity constraints compared to the digital graphic as transformed using a process incorporating inferred continuity constraints.
Figure 4:
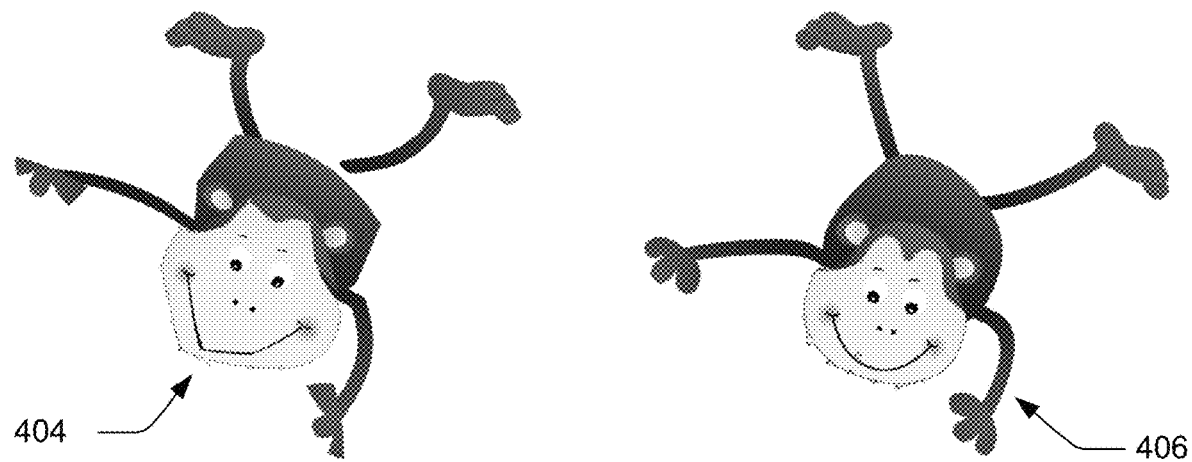

For example, consider FIG. 4, which depicts an example of a digital graphic 400 as transformed using a process without applied continuity constraints, compared to the digital graphic as transformed via the continuity module 204 incorporating inferred continuity constraints. The digital graphic 400 includes a number of control points that have retracted handles, such as the control point 402. Using conventional techniques that do not apply continuity constraints to retracted handles, deformations applied to the digital graphic 400 result in sharp edges after deformation to a digital graphic 404. Furthermore, conventional techniques do not preserve $C^1$ or $G^1$ continuity following the deformation.

On the other hand, the techniques described herein that infer continuity constraints of retracted handles maintain topology and smoothness of the digital graphic 400 after deformation to a digital graphic 406. Additionally, $C^1$ and $G^1$ continuity are maintained after the deformation utilizing the techniques described herein to generate the deformed digital graphic 406. By maintaining $C^1$ and $G^1$ continuity, subsequent deformations to the deformed digital graphic 406 may be made immediately by a user, without having to correct for sharpness imposed with conventional techniques after a single deformation as is the case with conventional techniques.

Returning to the discussion of FIG. 2, the continuity module 204 generates continuity data 206 which includes the determined or inferred continuity between segments of one or multiple Bezier curves of the digital graphic 202. A mesh generation module 208 receives the continuity data 206, and also receives user input(s) 210. The user inputs 210 may be, for instance, mouse input, keyboard input, touch input, voice input, and so forth. At least one of the user inputs 210 define handles on a vector object, such as a Bezier curve. The handles provide an indication of a portion of the digital graphic 202 that the user desires to deform or modify.

Another of the user inputs 210 perform an interaction with the handles that indicate a desired change to the digital graphic 202, such as a vector object of the digital graphic. For instance, if a first of the user inputs 210 defines handles on a vector object such as a Bezier curve, a second user input may deform the Bezier curve by interacting with the handles. By interacting with the handles, the user input 210 indicates a change in a location in one or more of the handles in a user interface. After receiving the user inputs 210, the mesh generation module 208 generates a mesh based on the deformed Bezier curve, such as by utilizing a skinning transformation as described below.

Figure 5:
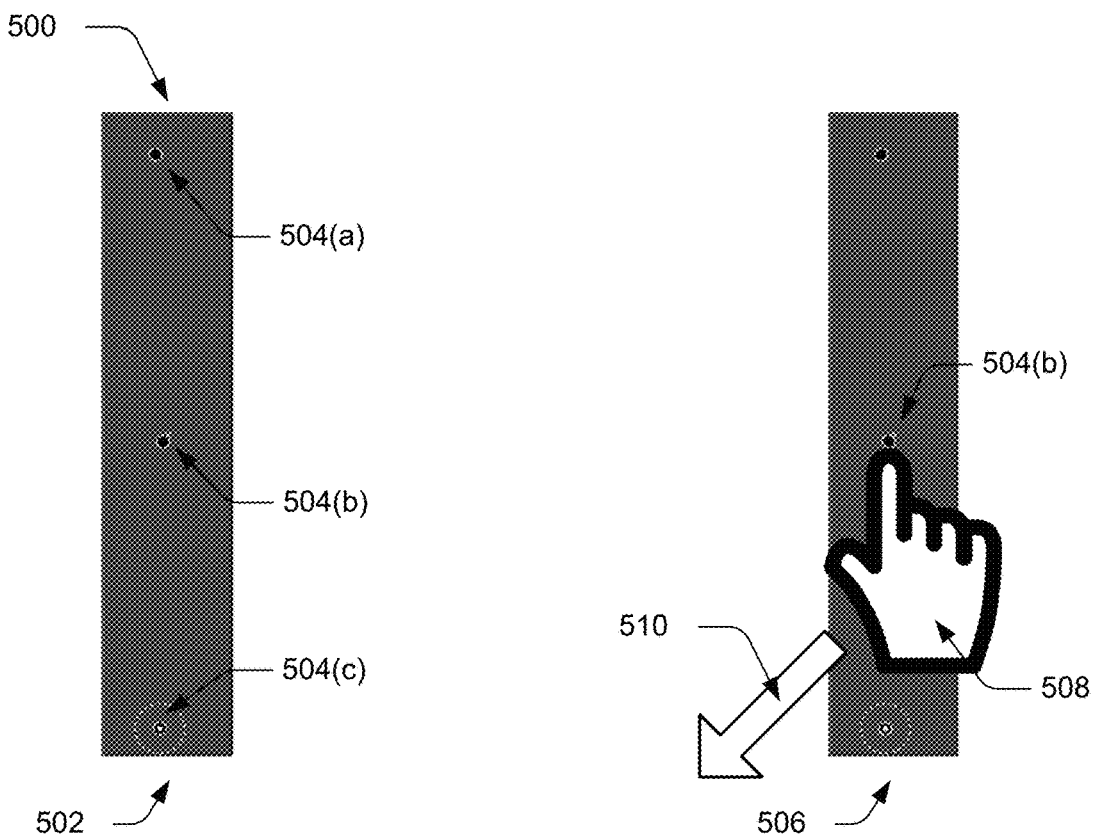
FIG. 5 depicts an example of a digital graphic before and after a skinning transformation is applied in response to a user input to create a deformed mesh.
Figure 5:
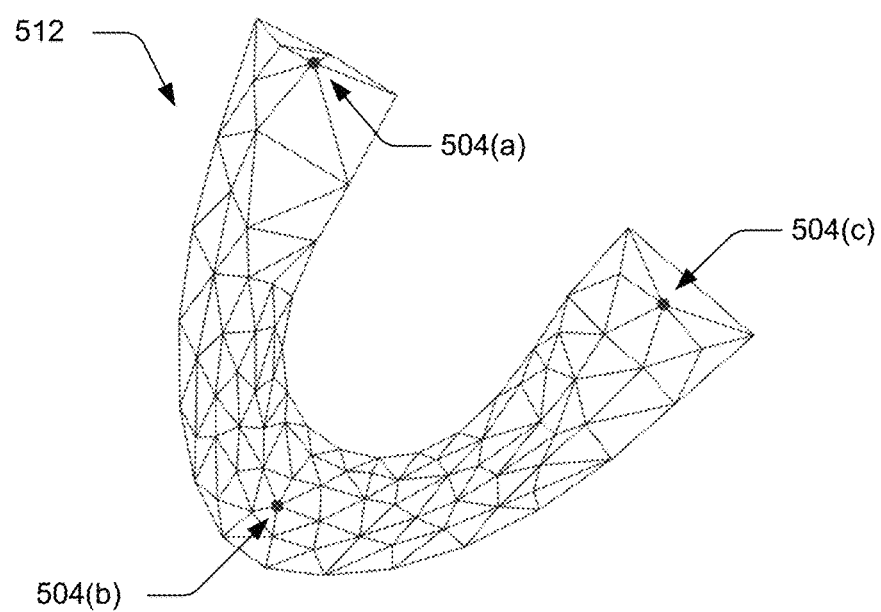

For example, consider FIG. 5, which depicts an example of a digital graphic 500 before and after a skinning transformation is applied in response to user inputs to create a deformed mesh. In a first depiction 502 of the digital graphic 500, the digital graphic includes three handles 504(a)-(c) placed on the digital graphic by a user, such as via the user inputs 210. For instance, the handles 504(a)-(c) may be placed by a mouse input and/or a touch input in a user interface, to name a few examples. The handles 504(a)-(c) provide an indication of a portion of the digital graphic 500 that the user desires to deform or modify.

In a second depiction 506 of the digital graphic 500, an icon 508 representing a user input is shown at the handle 504(b). In the second depiction 506, the user input specifies an interaction with the handle 504(b) indicating a desired change 510 to the digital graphic 500, in this example by moving the handle down and to the left. The user input indicates that the user desires to deform or modify the digital graphic at the handle 504(b) by changing the location of the handle in the user interface. The user input may be, for instance, a drag gesture by the icon 508 via a mouse input or touch input.

In response to the user input indicating the desired change 510 to the digital graphic 500, the mesh generation module 208, for instance, generates a mesh 512 based on the desired change. The mesh 512 retains the handles 504(a)-(c) from the digital graphic 500, with the handle 504(b) now positioned at the location in the user interface indicated by the desired change 510. In one example, the mesh generation module 208 applies a skinning transformation to the digital graphic 500 to generate the mesh 512 by first sampling the input segments of a Bezier curve of the digital graphic. Generally, a skinning transformation is a technique in which a surface representation used to draw an object (e.g., a skin or a mesh) and a hierarchical set of interconnected components of a rig (e.g., a skeleton or bones) are used to animate or fill the mesh. After sampling the input segments, the mesh generation module 208 creates a mesh representation using sample points from the input segments, and applies the skinning transformation to the mesh to compute new positions of the sample points. The mesh generation module 208 refits cubic Bezier segments over the newly positioned sample points. Other techniques for generating the mesh 512 are also contemplated.

Returning to the discussion of FIG. 2, the mesh generation module 208 outputs a mesh 212 that maps to a deformed curve 214 indicating the modification or deformation of the digital graphic 202 based on the user inputs 210. A curve generation module 216 receives the mesh 212 and the deformed curve 214, and uses the mesh and the deformed curve to locate control points of the mesh, while maintaining continuity constraints indicated in the continuity data 206. The curve generation module 216 applies the inferred continuity constraints in the continuity data 206 to segments of the mesh 212 to generate refitted segments 218.

To do so, the curve generation module 216 solves for the above $C^1$ continuity equation, with the following modification:

$$C_{31} - C_{21} = \alpha(C_{12} - C_{02}) \qquad (11)$$

Where $\alpha$ is the ratio of the original tangent lengths. The modification above results in all continuity constraints being linear, which allows for the continuity constraints to be modeled as a Least Squares Problem (LSQ). When modeled as a LSQ, the continuity constraints preserve accuracy of curves with respect to the sample points, thus matching Bezier curves to the newly formed mesh 212. The curve generation module 216 also applies $C^0$ continuity using the LSQ to maintain connectivity of segments in the input Bezier curves. Additionally, $C^1$ and $G^1$ constraints, if present in the input Bezier curve or inferred by the continuity module 204, are applied by the curve generation module 216 to maintain smoothness of the segments using the LSQ.

The curve generation module 216 can apply the LSQ to different numbers of samples per segment of a Bezier curve, along with supporting both hard and soft constraints, and applying different weights to continuity constraints to define precedence among the constraints. For example, the curve generation module 216 may use a low weight for curve accuracy as compared to continuity ($C^0$, $C^1$, $G^1$). Additionally, the curve generation module 216 computes a left hand side (LHS) of the LSQ only once, such as by resampling a cubic Bezier indicated by the deformed curve 214 at uniform parametric values dependent upon the length of the cubic Bezier, and using this uniform parameterization in the LHS. Consequently, the curve generation module 216 holds the LHS fixed throughout deformations, and can pre-factor the LHS for rapid solving of the LSQ. In this example, only the right hand side (RHS), which includes the location of the deformed sample points changes and is reassembled by the curve generation module 216. By using a LSQ, deformations can be performed more rapidly than with conventional techniques, as the linear equations of the LSQ are faster to solve than minimizing an energy function iteratively in an odd-even manner in conventional systems.

Additionally, the curve generation module 216 refits the segments of a Bezier curve of the digital graphic 202 to the deformed curve 214 using the control points, while maintaining continuity between the segments of the Bezier curve. To do so, the curve generation module 216 fits piece-wise cubic Bezier segments on sets of the sample points of the deformed curve 214 that correspond to respective segments of the input Bezier curve of the digital graphic 202. The curve generation module 216 minimizes error between the deformed sample points and the corresponding Bezier segment to be computed, without subdividing the segments of the deformed curve 214. Conventional techniques do subdivide curves in Bezier cubic curve fitting when maximum error exceeds a threshold, which increases complexity of the digital graphic being manipulated, making it more difficult to perform subsequent editing operations at the original resolution.

On the other hand, the curve generation module 216 minimizes a squared distance between the deformed curve 214 and the input Bezier curve of the digital graphic 202 by treating both the control points and $t_{ij}$ from Equation 1 as unknowns. The following is the error function to be minimized:

$$\min \Sigma_{i=1}^{n} \| \mathcal{B}(t_{ij}) C_j - d_{ij} \|^2 \qquad (12)$$

Where $\mathcal{B}(.)$ is the Bernstein Polynomial, $C_{ij}$ are the control points of the Bezier $j^{th}$ curve computed and $d_{ij}$ are the deformed (input) sample points. The above equation is minimized by taking both $t_{ij}$ and $C_j$ as unknowns and solving the equation iteratively. First, the curve generation module 216 estimates the parameter $t_{ij}$ using arc-length parameterization, which is used to solve for the initial values of C:

$$C_j = [\mathcal{B}(t_j)]^{-1} d_j \qquad (13)$$

In subsequent iterations, the curve generation module 216 refines the value of the initial solution by re-computing the value of the parameters $t_{ij}$ by using Newton-Rhapson's method to minimize the error function with respect to $t_{ij}$. Newton-Rhapson's method involves finding successively better approximations to the roots, or zeroes, of a real-valued function. The curve generation module 216 can alter the number of iterations performed based on the convergence of the error function to within permissible bounds. However, it may not always be possible to fit curve segments within a specified threshold, as the mesh may undergo any arbitrary deformation based on user inputs. Therefore, an upper bound may be placed on a maximum number of iterations to be performed before terminating, such as four iterations, although any number of iterations is contemplated.

Figure 6:
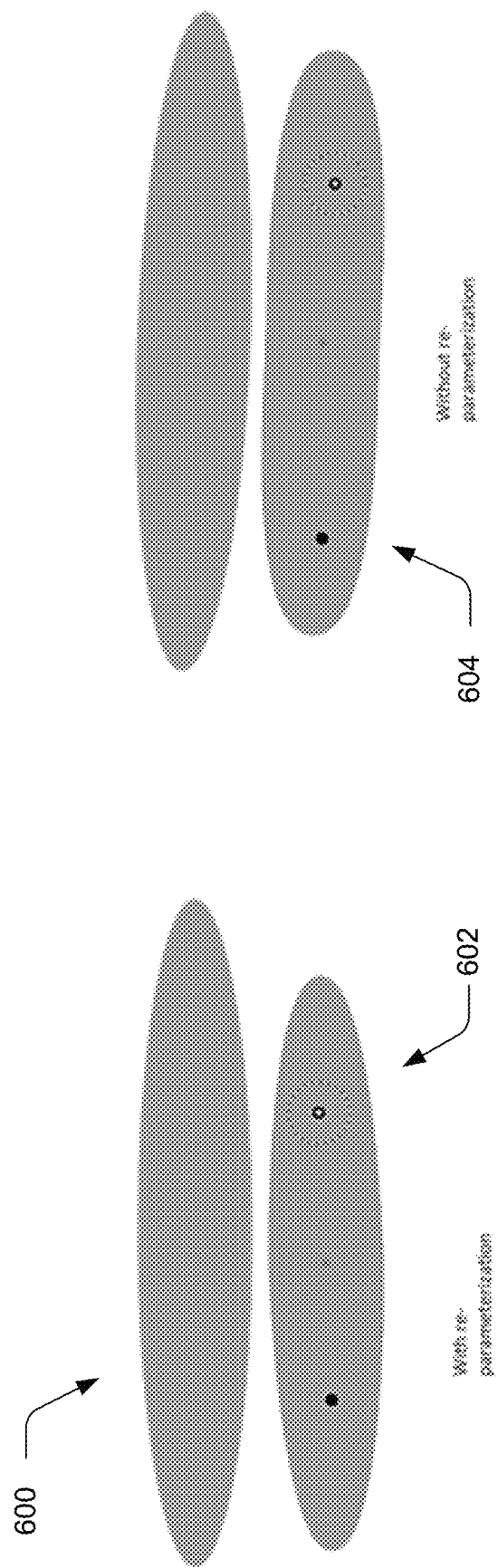
FIG. 6 depicts an example of a digital graphic before and after a deformation with re-parameterization, and before and after a deformation without re-parameterization.

Accordingly, the curve generation module 216 fits piecewise cubic Bezier segments using iterative re-parameterization which results in accurate curve fitting subject to continuity constraints of the original digital graphic. For example, consider FIG. 6, which depicts an example of a digital graphic 600 before and after a deformation with re-parameterization, and before and after a deformation without re-parameterization. The first example 602 shows the digital graphic 600 being deformed with the techniques described herein, applying iterative re-parameterization. With the iterative re-parameterization in the first example 602, sharpness of the geometry of the digital graphic 600 is preserved due to better curve fitting. On the other hand, the second example 604 shows the digital graphic 600 being deformed using conventional techniques that do not make use of iterative re-parameterization. Without the iterative re-parameterization in the second example 604, the digital graphic 600 loses sharpness of the geometry due to poor curve fitting, resulting in rounded edges that were not present in the original digital graphic in this example.

Returning to the discussion of FIG. 2, the curve generation module 216 may also transform shapes that are not represented as Bezier curves, which are expected to maintain their topology and regular properties under deformation. For example, a circle in an original vector graphic is expected to map to a circle in a deformed vector graphic. The ability of the curve generation module 216 to transform shapes that are not represented as Bezier curves is especially useful in cases such as icon design, where shapes are expected to maintain their original geometry despite deformations.

Rather than enforcing constraints of an original shape in the mesh deformation process, the curve generation module 216 adaptively samples an input shape from the digital graphic 202 and computes positions of these samples in the deformed mesh. Then, the curve generation module 216 determines correspondences between the input shape and the samples in the deformed mesh. The curve generation module 216 solves for an optimal scale along with a rigid transformation by minimizing a distance between a transformed shape and the deformed shape, such as by using a Kabsch algorithm. A Kabsch algorithm calculates an optimal rotation matrix that minimizes a root mean squared deviation (RMSD) between two paired sets of points. In this way, shapes map to a close-fitting version of the shape in the deformed mesh, allowing a user to control deformation in intuitive ways while preserving topology and regular properties of the shape.

The curve generation module 216 generates the refitted segments 218, which refit the segments of the original Bezier curve of the digital graphic 202 to the deformed curve 214 using the control points located in the mesh 212, such as by using the LSQ described above. The curve generation module 216 maintains continuity between the segments of the original Bezier curve of the digital graphic 202 when generating the refitted segments 218, such as by utilizing the LSQ and iterative re-parameterization described above. A vector output module 220 receives the refitted segments 218, and uses the refitted segments to generate a vector artwork 222 based on the deformed Bezier curve having the refitted segments. The vector artwork 222 generated by the vector output module 220, for instance, has a new set of Bezier curves and control points corresponding to the refitted segments 218.

In cases where the digital graphic 202 includes shapes that are not Bezier curves, the vector output module 220 generates the vector artwork 222 having new shapes corresponding to the input shapes of the digital graphic 202. The new shapes in the vector artwork 222 also include control points corresponding to the refitted segments 218. For example, if the digital graphic 202 includes an originally elliptical shape that is deformed by the user inputs 210, the vector artwork 222 will also include a corresponding elliptical shape that is modified or deformed based on the refitted segments 218.

The vector output module 220 outputs the vector artwork 222 for display, such as to a user interface module 224. The user interface module 224 outputs the vector artwork 222 in a user interface 226 of the computing device 102, such as in real time in response to the user inputs 210. Output of the vector artwork 222 in real time, or near real time, is enabled by the graphics modification module 124 solving a set of linear constraints as described above, which is much faster than conventional techniques that utilize minimization of an energy function iteratively in an odd-even manner The user interface 226 may enable a user of the computing device 102 to provide additional user inputs 210 to further deform or modify the vector artwork 222 that is displayed.

Figure 7:
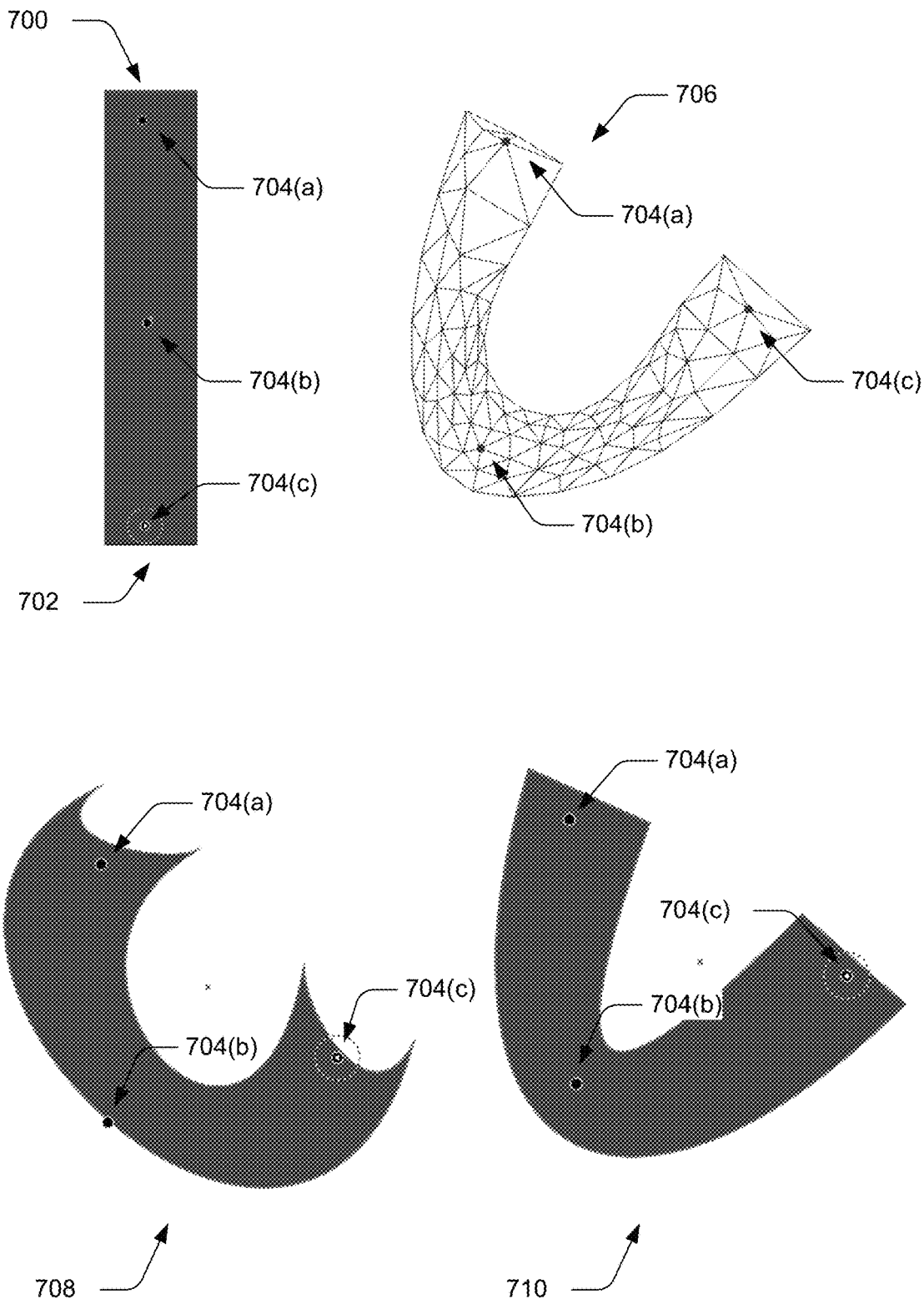
FIG. 7 depicts examples of a digital graphic being deformed using a quadratic energy minimization technique versus being deformed using the techniques for intuitive modifications of digital graphics described herein.

Turning now to FIG. 7, an example of a digital graphic 700 being deformed using a quadratic energy minimization technique versus being deformed using the techniques for intuitive modifications of digital graphics described herein. The digital graphic 700 may correspond to the digital graphic 500 of FIG. 5, for example. In a first depiction 702 of the digital graphic 700, the digital graphic includes three handles 704(a)-(c) placed on the digital graphic by a user, such as via the user inputs 210. The handles 704(a)-(c) provide an indication of a portion of the digital graphic 700 that the user desires to deform or modify.

Similar to the discussion of FIG. 5, the mesh generation module 208, for instance, generates a mesh 706 based on a user input indicating a desired change to the digital graphic 700. The mesh 706 retains the handles 704(a)-(c) from the digital graphic 700, with the handle 704(b) now positioned at the location in the user interface indicated by the desired change. The mesh generation module 208 in this example applies a skinning transformation to the digital graphic 700 to generate the mesh 706 by first sampling the input segments of a Bezier curve of the digital graphic. After sampling the input segments, the mesh generation module 208 creates a mesh representation using sample points from the input segments, and applies the skinning transformation to the mesh to compute new positons of the sample points, as described above.

A second depiction 708 of the digital graphic 700 shows a result of fitting Bezier curves of the deformed mesh using conventional techniques such as quadratic energy minimization, which increases degrees of freedom and in some cases can fail to converge. Increasing the degrees of freedom by some conventional systems includes segmenting the original Bezier curves of the digital graphic 700 into smaller curves to better fit the deformed mesh. However, adding degrees of freedom increases the size of the linear system to be solved when a modification or deformation is made, and can cause unwanted results when subsequent modifications are made with additional segments that were not present in the original digital graphic. Additionally, as seen in the second depiction 708, conventional techniques do not infer continuity in digital graphics, which results in the U-shapes on the shorter sides of the digital graphic 700. Without inferring continuity at the corners of the digital graphic 700, and by increasing the degrees of freedom to allow for the desired modification, properties such as these corners result in undesired changes to the digital graphic as seen in the second depiction at 708.

On the other hand, a third depiction 710 of the digital graphic 700 shows a result of the digital graphic being deformed using the techniques for intuitive modifications of digital graphics described herein. For instance, by inferring continuity at the corners of the digital graphic 700, and maintaining the same number of segments from the digital graphic 700, properties that define the shape of the digital graphic are maintained despite the deformation at the handle 704(b). Furthermore, using linear constraints to solve for the deformation of the digital graphic 700 is faster and requires less processing resources than conventional techniques that utilize quadratic energy minimization, thus allowing for deformations and modifications to be made to digital graphics interactively and in real time.

Figure 8:
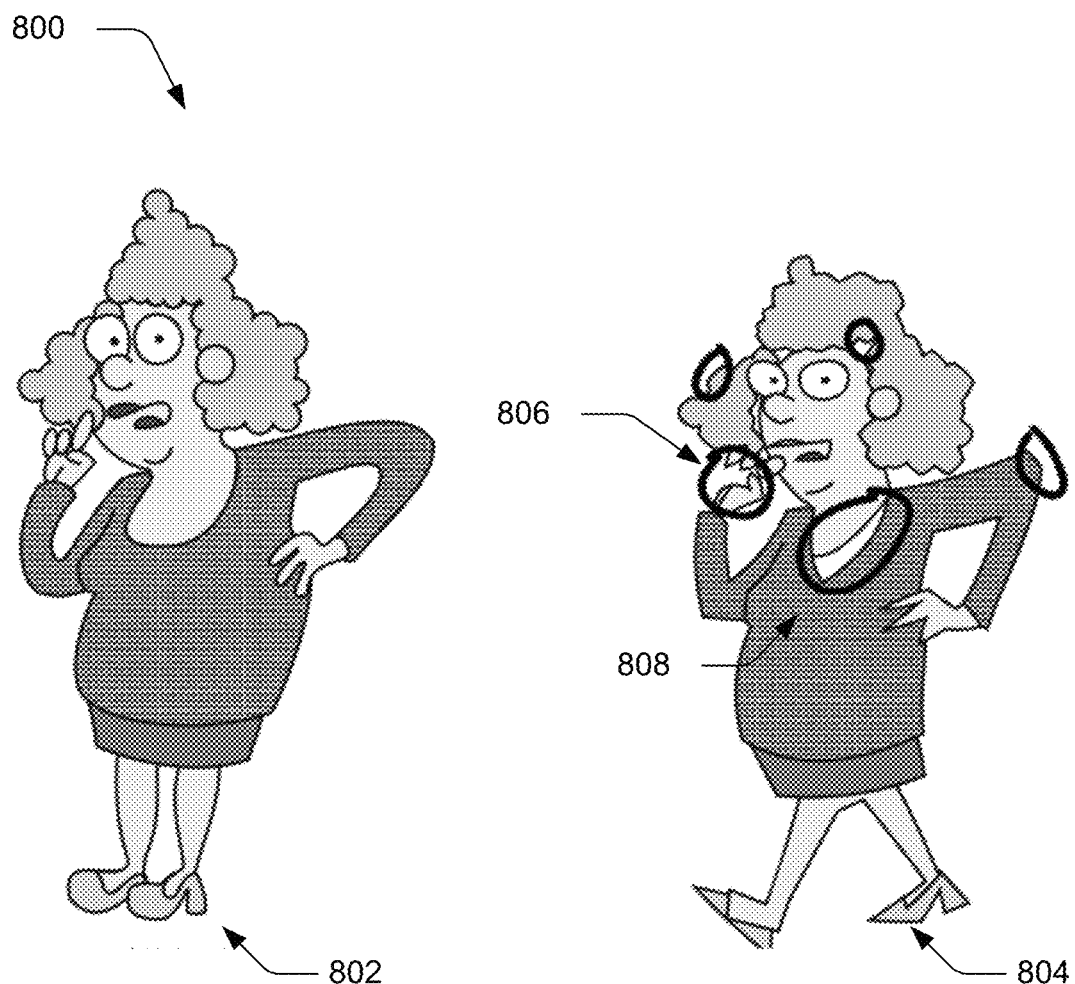
FIG. 8 depicts examples of a deformed digital graphic with inferred continuity constraints and curve fitting versus the deformed digital graphic without inferred continuity constraints and without curve fitting.

In another illustration, consider FIG. 8, which depicts an example 800 of a deformed digital graphic with inferred continuity constraints and curve fitting versus the deformed digital graphic without inferred continuity constraints and without curve fitting. A first depiction 802 of the digital graphic after an applied deformation includes the deformations applied with inferred continuity constraints, such as when the original digital graphic included retracted handles or no handles at different locations. The first depiction 802 of the digital graphic also includes the deformations applied with curve fitting by fitting Bezier segments on deformed sample points corresponding to segments of the input curves of the digital graphic. Rather than subdividing the segments as in conventional systems, the curve fitting applied to the first depiction 802 utilizes iterative re-parameterization as described above, by minimizing the squared distance between the deformed curve and the input segments.

In contrast, a second depiction 804 of the digital graphic after an applied deformation does not include inferred continuity constraints or include curve fitting. Consequently, negative spaces 806 and 808, for example, appear as a result of poor curve fitting of conventional systems, which do not recalculate $t_{ij}$ as described above. Additionally, the digital graphic in the second depiction 804 includes sharp edges, such as where a retracted handle may have been present in the original digital graphic and was not remedied by inferring continuity at these particular locations by a conventional system.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
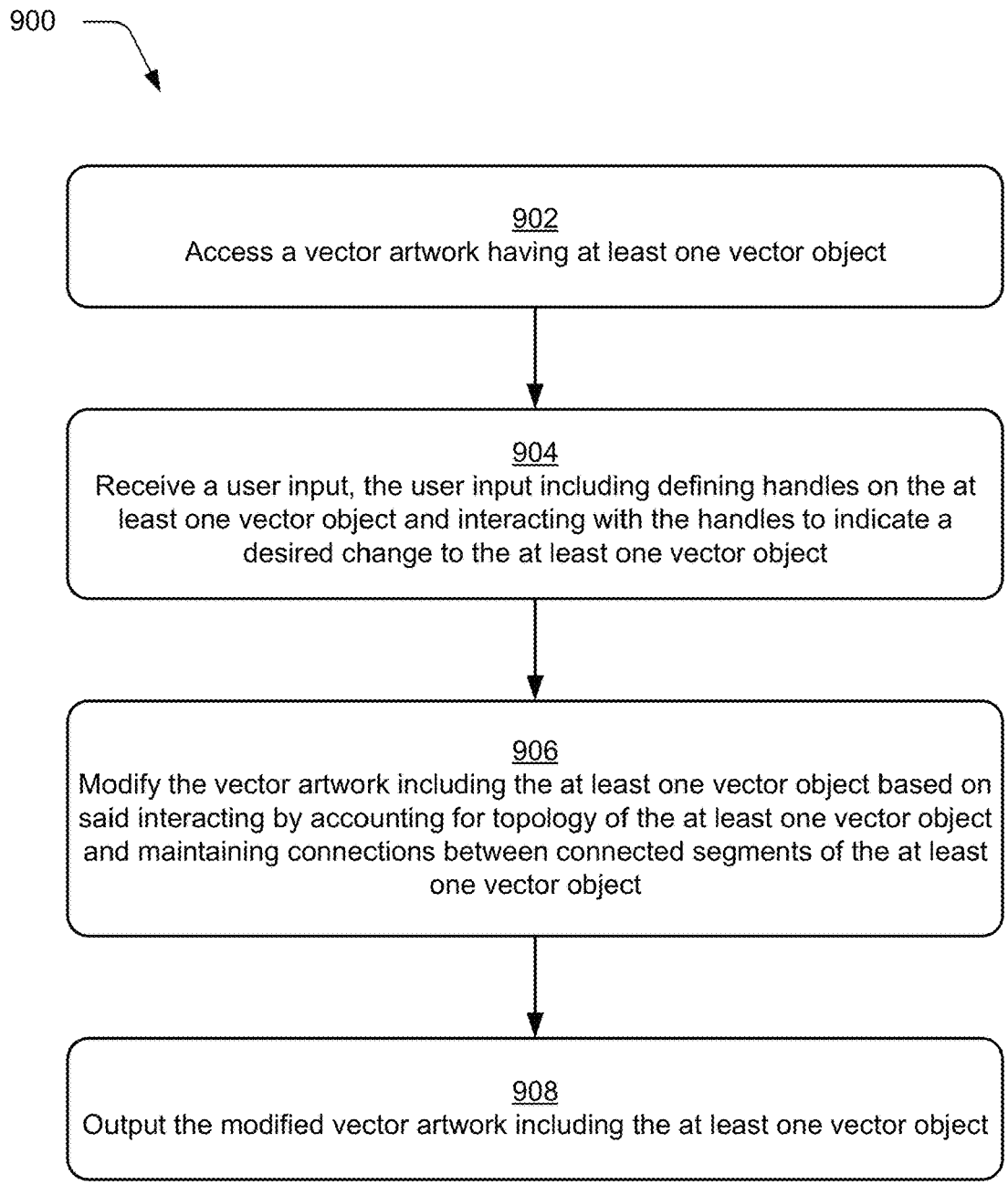
FIG. 9 is a flow diagram depicting a procedure in an example implementation in which vector artwork is modified by accounting for topology of the vector object and maintaining connections between connected segments of the vector object in a digital image creation system.

FIG. 9 depicts a procedure 900 in an example implementation in which vector artwork is modified by accounting for topology of the vector object and maintaining connections between connected segments of the vector object. First, a vector artwork having at least one vector object is accessed (block 902). The vector artwork, for instance, is a digital graphic, and the vector object may be a Bezier curve or other shape as described above. The vector artwork may be accessed in a user interface in the content editing application 124, such as from the storage 108 of the computing device 104, for example.

A user input is received that defines handles on the vector object, and interacts with the handles to indicate a desired change to the vector object (block 904). The user input may be, for instance, mouse input, keyboard input, touch input, voice input, and so forth. The user input(s) defining the handles provide an indication of a portion of the vector object that the user desires to deform or modify. The interaction with the handles indicates a change in a location of one or more of the handles in a user interface. For instance, if a first of the user inputs defines handles on a vector object such as a Bezier curve, a second user input may deform the Bezier curve by interacting with the handles.

The vector artwork, including the vector object, are modified based on the interacting by accounting for topology of the vector object and maintaining connections between connected segments of the vector object (block 906). For instance, topology of the vector object may be accounted for by curve fitting utilizing iterative re-parameterization, which fits Bezier segments on deformed sample points corresponding to segments of an input Bezier curve. Alternatively or additionally, topology of the vector object may be accounted for by adaptively sampling an input shape (e.g., not a Bezier curve), and determining positions of the samples in a deformed mesh, thus building a set of correspondences between input samples and deformed samples. Further, the connections between the connected segments of the vector object are maintained by inferring continuity constraints between Bezier curves, such as where control handles are not present or are retracted.

The modified vector artwork, including the vector object, is then output (block 908). The vector output module 220, for instance, generates the vector artwork 222 based on the topology of the vector artwork while maintaining the connections between the connected segments of the vector object. The vector artwork 222 generated by the vector output module 220, for instance, has a new set of Bezier curves and control points corresponding to the modifications. In cases where the vector artwork includes shapes that are not Bezier curves, the vector output module 220 generates the vector artwork 222 having new shapes corresponding to the input shapes of the vector artwork. For example, if the vector artwork includes an originally elliptical shape that is deformed by the user inputs, the modified vector artwork 222 will also include a corresponding elliptical shape that is modified or deformed based utilizing inferred continuity and the curve fitting techniques described herein. The vector output module 220 outputs the vector artwork 222 for display in the user interface 226, such as in real time in response to the user inputs.

Figure 10:
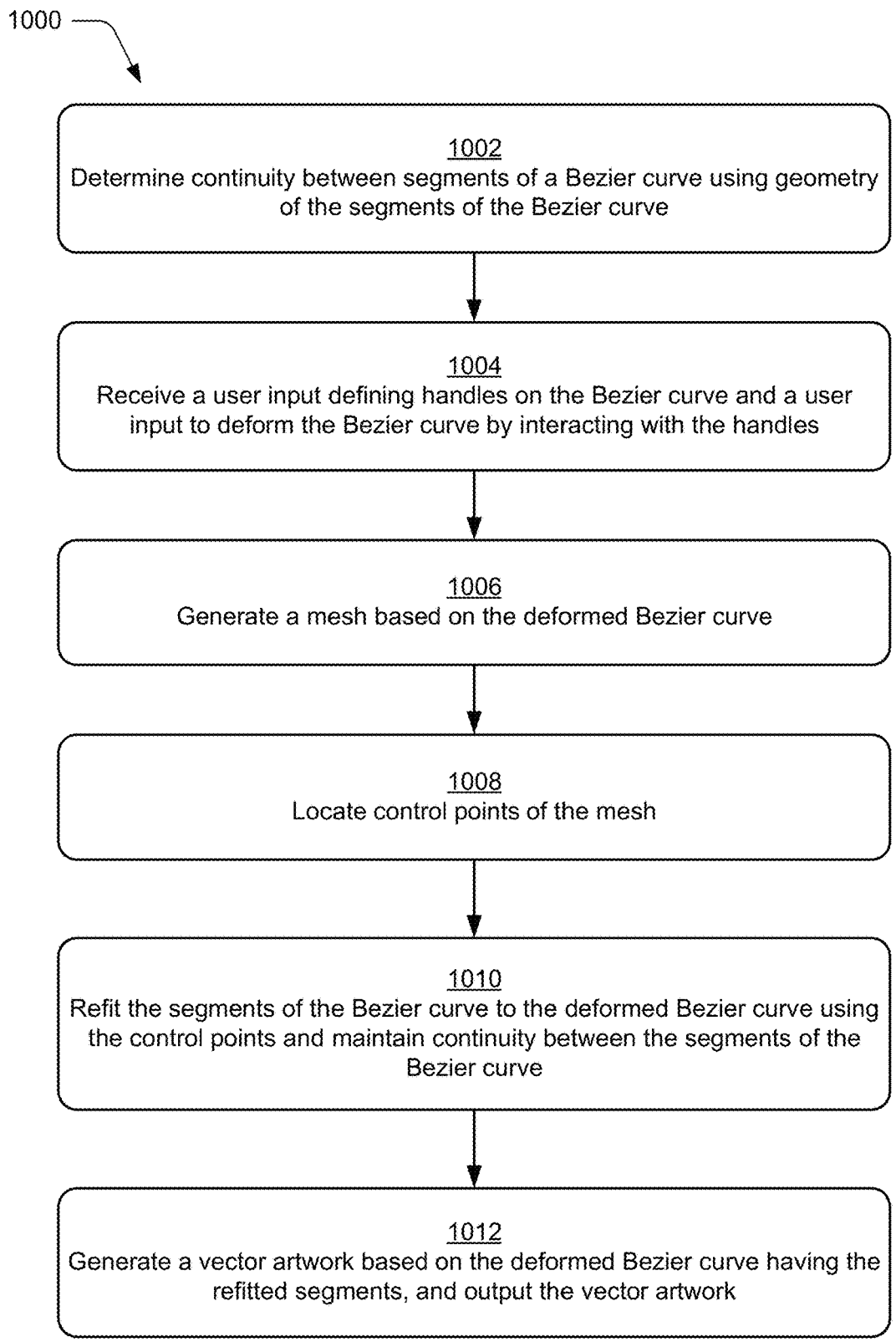
FIG. 10 is a flow diagram depicting a procedure in an example implementation in which a vector artwork is generated based on a deformed Bezier curve having refitted segments in a digital image creation system.

FIG. 10 depicts a procedure 1000 in an example implementation in which a vector artwork is generated based on a deformed Bezier curve having refitted segments. First, continuity is determined (e.g., inferred) between segments of a Bezier curve using geometry of segments of the Bezier curve (block 1002). The Bezier curve may be a component of a vector object of a digital graphic, such as a vector artwork. In one example, the continuity module 204 may sample and triangulate Bezier segments, such as cubic Bezier segments, of the input Bezier curves using conforming Delaunay triangulation in determining the continuity. In cases where $C^0$ continuity exists between two curves and one of the tangents is retracted (e.g., length is zero), the continuity module 204 infers continuity where the curves meet. To do so, the continuity module 204 checks lengths of the tangents of control points adjacent to a particular point having a retracted handle, and extends the retracted handle in a direction where $C^1$ continuity exists.

Next, a user input is received defining handles on the Bezier curve, and a user input is received to deform the Bezier curve by interacting with the handles (block 1004). The user inputs may be, for instance, mouse input, keyboard input, touch input, voice input, and so forth. The user input(s) defining the handles provide an indication of a portion of the Bezier curve that the user desires to deform or modify. The interaction with the handles indicates a change in a location of one or more of the handles in a user interface, as discussed above.

A mesh is then generated based on the deformed Bezier curve (block 1006). In one example, the mesh generation module 208 applies a skinning transformation to a digital graphic that includes the Bezier curve to generate the mesh by first sampling the input segments of the Bezier curve. After sampling the input segments, the mesh generation module 208 creates a mesh representation using sample points from the input segments, and applies the skinning transformation to the mesh to compute new positons of the sample points. The mesh generation module 208 refits cubic Bezier segments over the newly positioned sample points.

Control points of the mesh are located (block 1008). For example, the curve generation module 216 receives the mesh and the deformed Bezier curve, and uses the mesh and the deformed Bezier curve to locate control points of the mesh, while maintaining the continuity constraints. The curve generation module 216 solves for $C^1$ continuity by modifying the continuity constraints to be linear, which allows for the continuity constraints to be modeled as a Least Squares Problem (LSQ). When modeled as a LSQ, the continuity constraints match Bezier curves to the newly formed mesh. The curve generation module 216 also applies $C^0$ continuity using the LSQ to maintain connectivity of segments in the input Bezier curves. Additionally, $G^1$ constraints, if present in the input Bezier curve or inferred by the continuity module 204, are applied by the curve generation module 216 to maintain smoothness of the segments using the LSQ.

Segments of the Bezier curve are refitted to the deformed Bezier curve using the control points while maintaining continuity between the segments of the Bezier curve (block 1010). For example, the curve generation module 216 generates refitted segments, which refit the segments of the original Bezier curve to the deformed curve using the control points located in the mesh, such as by using the LSQ described above. The curve generation module 216 maintains continuity between the segments of the original Bezier curve when generating the refitted segments, such as by utilizing the LSQ and iterative re-parameterization as previously described. A vector artwork is then generated based on the deformed Bezier curve having the refitted segments, and the vector artwork is output (block 1012), such as in a user interface and in real time.

Using the techniques described herein, features of digital graphics are preserved across deformations, including preserving smoothness of curves in input geometry by accounting for topology and maintaining connections between connected segments of the digital graphics. Interacting with user-defined handles results in intuitive modifications to shapes of digital graphics, including implicit modification to underlying curves of the shapes, without needing explicit user selection of specific control points and/or curves. Further, the techniques described herein are faster and use less processing resources than conventional systems, which are not as robust especially across multiple deformations of a digital graphic. Consequently, users can quickly and easily modify and deform digital graphics without having to iteratively correct computational errors that were caused by modifications to digital graphics in conventional systems.

Example System and Device

Figure 11:
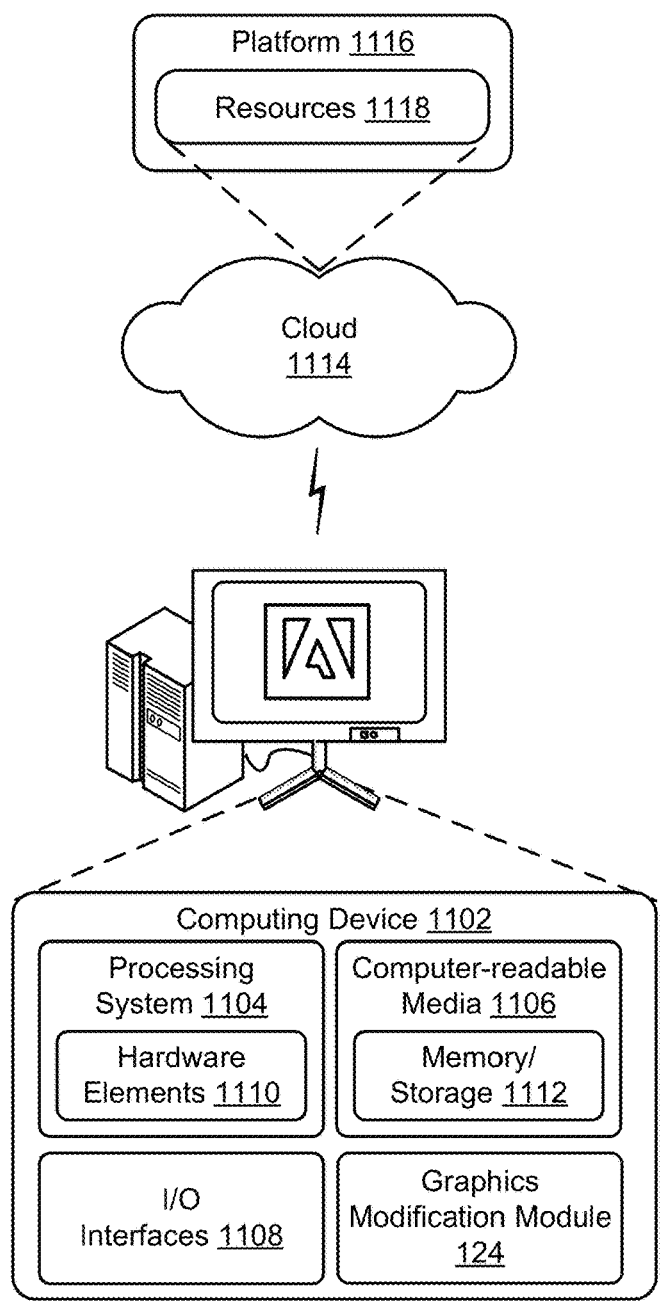
FIG. 11 illustrates an example system including various components of an example device that can be implemented as any type of computing device as described and/or utilized with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the graphics modification module 124. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    displaying vector artwork formed from a number of segments;
    receiving user input in relation to a control point connecting at least two of the segments, the user input indicating a deformation of the at least two segments, the at least two segments having a continuity at the control point, and one of an in-tangent or an out-tangent of the control point having a length of zero; and
    deforming the at least two segments to display modified vector artwork, in real-time as the user input indicating the deformation is received, by maintaining a same number of segments in the modified vector artwork and updating the continuity of the at least two segments at the control point by:
        extending the one in-tangent or out-tangent based on inferring the continuity at the control point; and
        solving a set of linear continuity constraints for the continuity, wherein the linear continuity constraints are functions of tangents associated with the at least two segments, including the in-tangent and the out-tangent.

2. The method of claim 1, wherein the set of linear continuity constraints models the continuity of the at least two segments at the control point as a Least Squares Problem (LSQ).

3. The method of claim 1, wherein the continuity of the at least two segments at the control point is updated by solving the set of linear continuity constraints for the continuity in lieu of minimizing an energy function iteratively.

4. The method of claim 1, wherein the one in-tangent or out-tangent of the control point is retracted to the length of zero.

5. The method of claim 1, wherein inferring the continuity at the control point includes sampling the geometry of the at least two segments.

6. The method of claim 1, further comprising preserving the continuity of the at least two segments at the control point, in part, by extending the one in-tangent or out-tangent to a length that is a function of a respective segment of the at least two segments.

7. The method of claim 1, wherein the user input is received to drag the control point to a different location.

8. The method of claim 1, wherein the user input is received to change a location of one or more handles corresponding to the control point.

9. The method of claim 1, wherein the linear continuity constraints include at least one constraint that is a function of tangent length of the tangents associated with the at least two segments.

10. A system comprising:
a vector output module implemented at least partially in hardware of a computing device to cause display of vector artwork formed from a number of segments;
an input module implemented at least partially in the hardware of the computing device to receive user input in relation to a control point connecting at least two of the segments, the user input indicating a deformation of the at least two segments, the at least two segments having a continuity at the control point, and one of an in-tangent or an out-tangent of the control point having a length of zero; and
a continuity module implemented at least partially in the hardware of the computing device to deform the at least two segments to generate modified vector artwork, in real-time as the user input indicating the deformation is received, by maintaining a same number of segments in the modified vector artwork and updating the continuity of the at least two segments at the control point by:
extending the one in-tangent or out-tangent based on inferring the continuity at the control point; and
solving a set of linear continuity constraints for the continuity, wherein the linear continuity constraints are functions of tangents associated with the at least two segments, including the in-tangent and the out-tangent.

11. The system of claim 10, wherein the vector output module is further configured to display the modified vector artwork, in real-time as the user input indicating the deformation is received.

12. The system of claim 10, wherein the set of linear continuity constraints models the continuity of the at least two segments at the control point as a Least Squares Problem (LSQ).

13. The system of claim 10, wherein the continuity of the at least two segments at the control point is updated by solving the set of linear continuity constraints for the continuity in lieu of minimizing an energy function iteratively.

14. The system of claim 10, wherein the one in-tangent or out-tangent of the control point is retracted to the length of zero.

15. The system of claim 10, wherein the continuity module is further configured to infer the continuity of the at least two segments at the control point, in part, by sampling the geometry of the at least two segments.

16. The system of claim 14, wherein the continuity module is further configured to preserve the continuity of the at least two segments at the control point, in part, by extending the one in-tangent or out tangent to a length that is a function of a respective segment of the at least two segments.

17. The system of claim 10, wherein the user input is received to drag the control point to a different location.

18. A method comprising:
displaying vector artwork formed from a plurality of segments;
receiving user input in relation to a control point connecting at least two of the segments, the at least two segments having a continuity at the control point, and one of an in-tangent or an out-tangent of the control point having a length of zero; and
deforming the at least two segments responsive to the user input in real-time to display modified vector artwork by updating the continuity of the at least two segments at the control point by:
extending the one in-tangent or out-tangent based on inferring the continuity at the control point; and
solving a set of linear continuity constraints for the continuity, wherein the linear continuity constraints are functions of tangents associated with the at least two segments, including the in-tangent and the out-tangent.

19. The method of claim 18, wherein the set of linear continuity constraints models the continuity of the at least two segments at the control point as a Least Squares Problem (LSQ).

20. The method of claim 18, wherein the continuity of the at least two segments at the control point is updated by solving the set of linear continuity constraints for the continuity in lieu of minimizing an energy function iteratively.

* * * * *